United States Patent [19]
Schierling et al.

[11] Patent Number: 5,575,183
[45] Date of Patent: Nov. 19, 1996

[54] DUAL-MASS FLYWHEEL

[75] Inventors: Bernhard Schierling, Kürnach; Hilmar Göbel, Grafenrheinfeld; Georg Kraus, Bergrheinfeld; Bernd Stockmann, Röthlein, all of Germany

[73] Assignee: Fichtel & Sachs AG, Schweinfurt, Germany

[21] Appl. No.: 449,529

[22] Filed: May 24, 1995

Related U.S. Application Data

[62] Division of Ser. No. 163,134, Dec. 7, 1993.

[30] Foreign Application Priority Data

Dec. 10, 1992 [DE] Germany .......................... 42 41 520.9
Nov. 18, 1993 [DE] Germany .......................... 43 39 421.3

[51] Int. Cl.$^6$ ........................................................ F16D 3/14
[52] U.S. Cl. ........................... 74/574; 74/572; 74/573 R; 192/201; 464/66; 464/68
[58] Field of Search ................... 74/572, 573 R, 74/574; 192/55.4, 55.61, 70.17, 201, 212; 464/66, 67, 68

[56] References Cited

U.S. PATENT DOCUMENTS

| | | | |
|---|---|---|---|
| 5,042,632 | 8/1991 | Jackel | 74/574 |
| 5,083,981 | 1/1992 | Forster | 74/574 |
| 5,119,693 | 6/1992 | Naudin et al. | |
| 5,146,811 | 9/1992 | Jäckel | |
| 5,273,372 | 12/1993 | Friedmann et al. | 74/574 |
| 5,355,747 | 10/1994 | Kajitani et al. | 74/574 |

FOREIGN PATENT DOCUMENTS

| | | |
|---|---|---|
| 0427983 | 5/1991 | European Pat. Off. . |
| 3909892 | 12/1989 | Germany . |
| 2168784 | 6/1986 | United Kingdom . |
| 2170295 | 7/1986 | United Kingdom . |
| 2191265 | 12/1987 | United Kingdom . |
| 2217429 | 10/1989 | United Kingdom . |
| 2219647 | 12/1989 | United Kingdom . |
| 2234574 | 2/1991 | United Kingdom . |
| 2244788 | 12/1991 | United Kingdom . |
| 2251284 | 7/1992 | United Kingdom . |

Primary Examiner—Charles A. Marmor
Assistant Examiner—Chong H. Kim
Attorney, Agent, or Firm—Brumbaugh, Graves, Donohue & Raymond

[57] ABSTRACT

A dual-mass flywheel comprises a primary mass (7) which is adapted to be fastened to a crankshaft (3) of an internal-combustion engine concentric to an axis of rotation (1) and a secondary mass (9) which is mounted for rotation relative to the primary mass (7) around the axis of rotation (1). The secondary mass (9) is coupled in a rotationally elastic manner to the primary mass (7) by a torsion-damping arrangement (19). The primary mass has two formed sheet-metal parts (35, 37) which define a cavity (47) to accommodate springs (17) of the torsion-damping arrangement (19) and is provided with supplementary masses in order to increase the moment of inertia. The supplementary masses may be made up of extensions (45, 63) of the formed sheet-metal parts (35, 37) or of additionally welded-on mass-rings (67). In particular, the supplementary masses are located in a region which is generally radially outwardly of the secondary mass (9).

10 Claims, 4 Drawing Sheets

DUAL-MASS FLYWHEEL

This application is a division of application Ser. No. 08/163,134, filed on Dec. 7, 1993.

BACKGROUND OF THE INVENTION

The present invention relates to a dual-mass flywheel for the drive train of an automotive vehicle.

A dual-mass flywheel for the drive train of an automotive vehicle, which is described and shown in DE-A-39 09 892, has a primary mass that is adapted to be fastened concentrically with the axis of rotation to a crankshaft of the internal-combustion engine of the automotive vehicle and a secondary mass which is mounted for rotation around the axis of rotation relative to the primary mass. The secondary mass is attached to a friction clutch located in the drive train between the internal-combustion engine and a gear box of the automotive vehicle. The secondary mass is coupled in a rotationally elastic manner with the primary mass by a torsion-damping arrangement.

The primary mass of the previously known dual-mass flywheel is made up essentially of two formed sheet-metal parts. A first part has the shape of a pan and includes a base wall portion that lies essentially radially and is attached to the crankshaft and a peripheral flange portion, which is joined to the perimeter of the base portion and extends in an essentially axial direction away from the crankshaft. The second formed sheet-metal part of the dual mass flywheel forms a wall that extends in an essentially radial direction and is attached at its perimeter to the flange portion of the first part. Together, the two formed sheet-metal parts define a cavity which is concentric with the axis of rotation and is located in a radially outer region of the primary mass. The cavity receives the springs of the torsion-spring arrangement.

In such a dual-mass flywheel, the primary mass has a comparatively complicated shape, inasmuch as it accommodates the torsion-damping arrangement in the cavity. If formed sheet-metal parts are used, the desired shape can be produced in a sufficiently practical manner. It has been found, however, that the flywheel mass of a primary mass made up of sheet-metal parts is too low for many applications. Consequently, consideration could be given to using thicker sheet-metal for the formed sheet-metal parts; however, on the one hand, this complicates manufacture, and on the other hand, it becomes impractical for reasons of space, in particular because accommodation of the springs of the torsion-damping arrangement requires a certain amount of assembly space.

SUMMARY OF THE INVENTION

It is an object of the invention to provide a structurally simple and economically feasible way of increasing the moment of inertia of the primary mass of a dual-mass flywheel while still permitting the flywheel to be produced from formed sheet-metal parts.

The foregoing object is achieved, in accordance with the present invention, by providing supplementary-mass parts at appropriate places in the radially outer region of the primary mass. The additional mass is added to the primary flywheel part without reducing the internal mounting space for the springs of the torsion-damping arrangement. Moreover, the thickness of the components, in particular, of the formed sheet-metal components, may be the same as in conventional, previously known flywheels.

In general terms, the invention is a dual-mass flywheel which includes: a primary mass that is adapted to be fastened to a crankshaft of an internal-combustion engine in a position that is centered on an axis of rotation; a secondary mass, which is supported in a manner such that it is rotatable around the axis of rotation, relative to the primary mass, and is adapted to have a friction clutch attached to it; and a torsion-damping arrangement which couples the secondary mass in a rotationally elastic manner with the primary mass.

Specifically, the primary mass is composed of two formed sheet-metal parts. A first part is pan-shaped, having a base wall portion that extends in an essentially radial direction and can be fastened to the crankshaft and a peripheral flange portion which is joined to a radially outward portion of the base portion and extends in an essentially axial direction away from the crankshaft. A second formed sheet-metal part is attached to the peripheral flange portion of the first part and, jointly with the first part, defines a cavity that is concentric to the axis of rotation and is located in the radially outer region of the primary mass and that receives springs of the torsion-damping arrangement.

According to a first aspect of the invention—an aspect that is also important in the case of primary masses which are not made of formed sheet-metal parts—the primary-mass has in the region near its outer perimeter, a centered, axially extending mass-ring extension into which the secondary mass extends (at least partially) in an axial direction. In this case, it is preferred that in an axial direction, the mass-ring extension overlies the external perimeter of a mass-disk of the secondary mass (which mass-disk functions as the carrier for the friction clutch). In so doing, one can either vary the mass distribution of the secondary mass (which normally represents the counter-pressure plate of the friction clutch); or else, there is assembly space available in any event radially outside the friction clutch that can be used for increasing the moment of inertia of the primary mass. The mass-ring extension overlies the secondary mass in an axial direction, preferably essentially entirely.

To the extent to which the primary mass consists of formed sheet-metal parts of the type described above, it is preferable that the second formed sheet-metal part also take the shape of a pan and have a base wall portion that forms the cavity and extends in an essentially radial direction, as well as a peripheral flange portion which connects to the base wall portion radially outward, and extends in an essentially axial direction away from the crankshaft. The peripheral flange portion of at least one of the two formed sheet-metal parts—and preferably of both formed sheet-metal parts—is lengthened axially to make up the mass-ring extension; in other words, the flange portion is extended beyond the dimension required to fasten the flange portions to each other. In such a design, one can raise the moment of inertia on the primary side without having to change the thickness of the material in the two formed sheet-metal parts. The provision of extensions of the flange portions of both parts facilitates manufacture of the flywheel, in particular because it permits a mutual centering of the two formed sheet-metal parts by engagement of their peripheral flange portions, and also because the two formed sheet-metal parts can be connected to each other, tightly and rigidly, in a simple manner.

An improvement of the above-mentioned form of embodiment can be achieved if the peripheral flange portion of the first formed sheet-metal part has a ring-shaped step and has on the side of the step which faces away from the crankshaft a diameter that is greater than the diameter on the side closer to the crankshaft. The step can be used, on the one hand, for the axial positioning of the two formed sheet-metal parts; it is preferred, however, that a supplementary mass-ring be inserted between the second formed sheet-metal part and the step. The mass-ring is axially fixed between the step and the second formed sheet-metal part.

While in the form of embodiment described above the mass-ring extension is achieved by means of integral extensions of the formed sheet-metal parts, one can also provide, in another variant, that the mass-ring extension be made up of a separate mass-ring which is rigidly connected to at least one of the two formed sheet-metal parts, and preferably to both formed sheet-metal parts. Such a supplementary mass-ring can serve other functions, over and above its function of raising the mass moment of inertia. In particular, a closed ring may have the ring gear of the engine starter on its outer periphery.

In a preferred embodiment, the mass-ring is centered and welded onto at least one of the formed sheet-metal parts. Preferably, the extension is carried out in a manner such that the mass-ring is centered on a ring extension of the second formed sheet-metal part and lies opposite and adjacent to a front surface of the peripheral flange portion of the first formed sheet-metal part. In that case, the two formed sheet-metal parts as well as the mass-ring can be attached to each other in a tight and rigid manner, by means of a common enveloping weld seam.

In embodiments in which the starter ring gear is provided on the mass-ring, as described above, and the mass-ring is arranged axially lateral to the primary mass, the assembly space which as a rule is then available in the radial vicinity of the peripheral flange portion of the first formed sheet-metal part can be taken advantage of for the purpose of attaching further supplementary masses. For instance, at least one essentially ring-shaped supplementary-mass element can be attached to the outer perimeter of the peripheral flange portion of the first formed sheet-metal part. If appropriate, such a ring could also be made up of ring segments, each of which segments is attached, such as by welding, to the peripheral flange portion. The second formed sheet-metal part can, like the first part, be pan-shaped, such that it has a peripheral flange portion that extends essentially axially with respect to the crankshaft and axially overlaps the peripheral flange portion of the first formed sheet-metal part and, in particular, extends into the peripheral flange portion of the first formed sheet-metal part.

Because of the location of the dual-mass flywheel inserted between the internal-combustion engine and the primary mass, there will be assembly space available in a number of applications that can also be used for accommodation of supplementary masses. For instance, supplementary mass-rings, in particular disk-shaped rings, can be welded on in the radially outer region of the base wall portion of the first formed sheet-metal part.

According to a second aspect of the invention, which aspect takes particular advantage of available assembly space in some installations, at least one supplementary mass-ring arrangement is provided within the cavity enclosed by the two formed sheet-metal parts, which ring arrangement is axially and radially fixed to at least one of the formed sheet-metal parts. In this manner, one can, on the one hand, take advantage of the assembly space that is available within a portion of the cavity, in order to attach supplementary mass-rings or similar arrangements. In particular, however, one can, by appropriately shaping the formed sheet-metal parts, expand the cavity into the assembly space that is partially available outside the primary mass and then use the cavity to accommodate the mass-rings. One of the advantages brought about by locating the supplementary masses within the cavity provided for the springs of the torsion-damping arrangement lies in the fact that the incorporation of the supplementary masses is achieved more easily. Generally, the supplementary masses that are arranged in ring-shaped fashion within the cavity are retained by capturing them mechanically, such as by utilizing components of the primary mass which are present in any case.

In a preferred embodiment, a ring-shaped bulge which protrudes outward from the cavity is formed in a wall portion extending in an essentially radial direction of a least one of the two formed sheet-metal parts, preferably the base wall portion of the first formed sheet-metal part, and the supplementary-mass ring arrangement is installed in the bulging portion. In this manner, even supplementary-mass ring arrangements which, if appropriate, are segmented can be accommodated in the cavity, and it is not necessary to disrupt a closed and more or less even-surfaced outer contour of the primary mass. By appropriately shaping the bulge, one can achieve a secure fixing of the ring arrangement within the bulge, for instance, by making the bulge with a cross-sectional inner contour that narrows from the cavity outward, in which contour the ring arrangement can be radially fixed by, say, axial bracing. If the bulge is essentially cylindrical in a radially outward direction, the centrifugal forces of this region are also securely absorbed.

In order to fix the ring arrangement in the bulge in an axial direction, the bulge can be closed at least partially by means of additional elements, attached (for instance, by welding) to the formed sheet-metal parts. Such an additional element could involve, say, a disk-shaped ring; preferably, however, one would choose for such an element a support plate which is required in any event to support the springs of the torsion-damping arrangement; in the conventional manner, the support plate acts jointly with one of the front ends of at least one of the springs of the torsion-damping arrangement, which springs are accommodated in the cavity.

However, fixing the supplementary-mass ring arrangement can also be achieved without such additional elements by means of an appropriate design of the bulge, for example, by forming the bulge so that is has an axial undercut towards the cavity, the supplementary-mass ring arrangement being designed as a radially elastic ring-element which is held in the bulge by the undercut. To the extent to which the ring element is slit, it can also be fixed in a circumferential direction by means of an axial depression of the bulge, which depression extends into the slit. In another arrangement, the cross-sectional contour of the supplementary-mass ring may be made essentially identical to the cross-sectional inner contour of the bulge in order to achieve a maximum increase of the mass moment of inertia. The matching of the cross-sectional contour can be achieved by appropriate working of the ring arrangement, such as by stamping or forging it. In order to achieve the desired contour, the ring arrangement can also be made up of several individual parts.

In the case of dual-mass flywheels whose primary mass is built up in the conventional manner out of two formed sheet-metal parts, the formed sheet-metal parts are connected to each other in butt fashion. According to a third aspect of the invention, the region in which the two formed sheet-metal parts are connected is taken advantage of in order to raise the mass moment of inertia. The peripheral flange portion of the first formed sheet-metal part (which extends in an essentially axial direction) or the wall of the second formed sheet-metal part (the latter wall running in an essentially radial direction) make a transition into an integral, one-piece enveloping bend, in order to form a supplementary mass, said bend abutting against the above-mentioned wall of the respective other sheet-metal part or against an extension of said wall, and being in this region rigidly and tightly connected with the wall and/or its extension. Such measures not only make it possible to raise the mass moment of inertia by means of a simple structural design, but they also facilitate the centering of the two formed sheet-metal parts against each other, particularly if the bend is provided on the second formed sheet-metal part.

To the extent to which the bend is provided on the second formed sheet-metal part, that bend can face axially away from the crankshaft and/or the base wall portion of the first sheet-metal part, and in particular, as previously explained, it can extend beyond the outer perimeter of the secondary mass. The bend of the second formed sheet-metal part, however, may also extend towards the base wall portion of the first formed sheet-metal part. In particular, if the bend extends all the way to the region of the base wall portion, the mass may be substantially increased in a radially outer region, which greatly increases the moment of inertia.

Alternatively, the bend can also be provided on that end of the peripheral flange portion of the first formed sheet-metal part which is distant from the base wall portion, with the bend extending radially outward. In this fashion, there is created on the primary mass a collar that protrudes radially beyond the peripheral flange portion and not only raises in itself the mass moment of inertia but also can have affixed to it a supplementary-mass ring. This can be done, for instance, in a manner such that the supplementary-mass ring is placed axially between the collar and a starter ring gear, the latter also being placed upon the peripheral flange portion. If appropriate, the supplementary-mass ring can be secured against rotating by means of teeth or the like.

As already explained above, there is often available, in the vicinity of the internal assembly space of the dual-mass flywheel, space which can be put to use by attaching supplementary masses to the outer side of the primary mass. According to another aspect of the invention, this can be achieved in a particularly simple manner of construction by attaching a ring-shaped supplementary mass, concentrically with the axis of rotation, on the radially outer side of the peripheral flange portion of the first formed sheet-metal part (axially lateral to the starter ring gear) or on the outer side of the base wall portion of the first formed sheet-metal part, which base wall portion is adjacent to the outer side of the crankshaft. In a practical way, the cross-sectional design of the material of this supplementary mass matches the shape of the first formed sheet-metal part. Thus, preferably at least one ring element designed as a disk part is welded to the base wall portion, while at least one cylinder-shaped ring element is welded to the peripheral flange portion. The ring elements may consist each of several circumferentially adjacent segments in a manner such that they allow manufacture with relatively low material waste. This is particularly true for cylindrical ring elements using pre-bent sheet-metal strips. The ring elements may also be designed as closed rings, particularly if they are intended for attachment to the first formed sheet-metal part, not by welding but by mechanical locking.

For a better understanding of the invention, reference may be made to the following description of exemplary embodiments taken in conjunction with the accompanying drawings.

DESCRIPTION OF THE EMBODIMENTS

Figure 1:
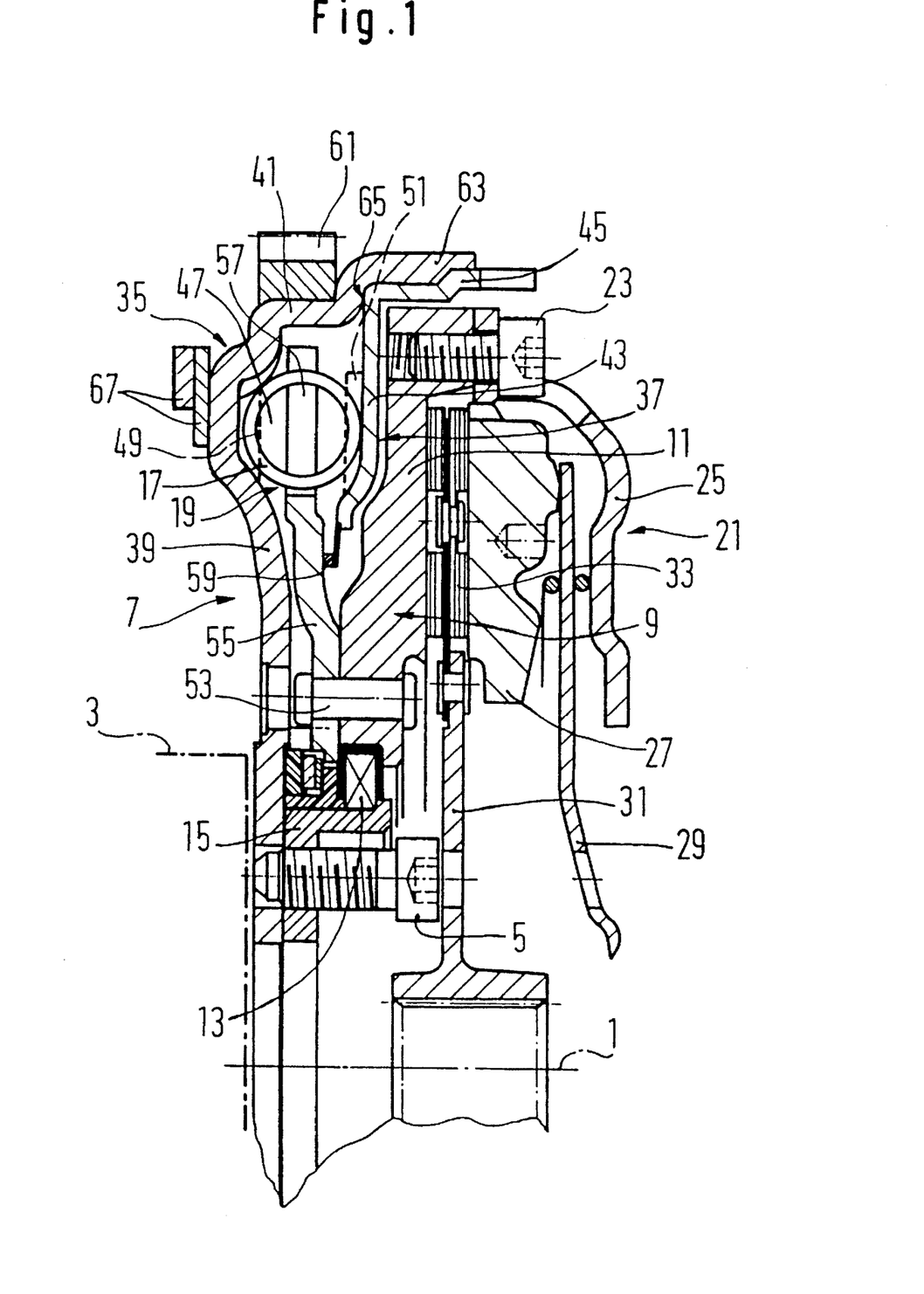
FIG. 1 is a partial axial lengthwise cross-sectional view through a dual-mass flywheel that is to be arranged in the drive train of an automotive vehicle.

FIG. 1 shows an axial lengthwise section through the upper half of a dual-mass flywheel that is arranged in the drive train of an automotive vehicle. The flywheel includes a primary mass 7 that is adapted to be attached by means of screws 5 to a crankshaft 3 of an internal-combustion engine of the automotive vehicle in a position centered on an axis of rotation 1 of the crankshaft and a secondary mass 9 that is mounted for rotation relative to the primary mass 7 around the axis of rotation 1. The secondary mass 9 includes a secondary disk 11 that is supported for rotation by a bearing 13, the bearing being carried by a bearing support ring 15, which is attached to the crankshaft 3 by means of the screws 5. The secondary mass 9 is coupled in a rotationally elastic manner to the primary mass 7 by several springs 17 of a torsion-damping arrangement 19. The secondary mass 9 carries a friction clutch 21, which is of a conventional design and includes a clutch housing 25, which is attached to the secondary disk 11 by means of screws 23 near the outer perimeter of the secondary disk 11. A pressure plate 27 is supported in the clutch housing 25 in a manner such that it is non-rotatable but axially movable and is biased in the direction of the secondary disk 11 by a clutch mainspring, such as a diaphragm spring 29 supported on the clutch housing 25. The friction linings of a clutch disk 33 are fictionally engaged between the pressure plate 27 and a secondary disk 11 which forms a counter-pressure surface.

The primary mass 7 is composed of two formed sheet-metal parts 35, 37, each of which is essentially pan-shaped. The formed sheet-metal part 35 has a base wall portion 39 which extends in an essentially radial direction, which wall in its radially inner region is adapted to be fastened to the crankshaft 3 by means of screws 5. A peripheral flange portion 41 projects from the radially outer region of the base wall portion 39 away from the crankshaft 3 in an essentially axial direction. The second formed sheet-metal part 37 has a wall thickness that is less than that of the above-mentioned first formed sheet-metal part 35 and includes a base wall part 43 that extends in an essentially radial direction at an axial distance from the base wall portion 39; said wall part 43 in its outer region also makes a transition into a peripheral flange portion 45 which extends in an essentially axial direction, extending away from the crankshaft 3. The peripheral flange portions 41, 45 are connected to each other in a rigid and tight manner, such as by welding. The two formed sheet-metal parts 35, 37 define in the radially outer region of the primary mass 7 a cavity 47 which surrounds concentrically the axis of rotation 1 and contains the springs 17 of the torsion-damping arrangement 19. The torque to be transferred by the primary mass 7 is conveyed by the support plates 49, 51 (which are rigidly connected with the base wall portion 39 and/or the part 43) into the front sides of the springs 17. A hub disk 55 connected non-rotatably with the secondary disk 11 by means of rivets 53 forms the output part of the torsion-damping arrangement 19. Arms 57 on the hub disk 55 extend into the cavity 47 and engage the springs 17. If appropriate, the cavity 47 can be filled at least in part with a lubricant or a damping fluid, in which case it is sealed off by a sealing-ring 59 located between the wall part 43 and the hub disk 55.

In operation, the torque generated by the internal-combustion engine is transferred by the two formed sheet-metal parts 35, 37 and the support plates 49, 51 to the springs 17 of the torsion-damping arrangement 19; the springs transfer it to the friction clutch 21 via the hub disk 55 and the secondary disk 11. The vibrational behavior is determined by the mass moment of inertia of the primary mass 7, by the mass moment of inertia of the secondary mass 9, and by the spring characteristics of the torsional vibration-damper 19. The vibrating masses of the primary mass 7 and of the secondary mass 9 must lie in a specific range of ratios, if the rotary vibrations are to be sufficiently inhibited, or transferred into a range of speed-of-rotation (rpm) which is of no importance to the operation of the automotive vehicle. The flywheel mass of the secondary mass 9 is defined, on the one hand, by the mass disk 11, by the hub disk 55, and by the components of the friction clutch which are connected to the latter; one can only add the clutch disk 31 and the components of the gear box to the flywheel effect if the clutch is engaged. For the flywheel effect of the primary mass 7, there are included in the first place the flywheel effects of the two formed sheet-metal parts, of the springs 17, and of the starter ring gear 61 on the peripheral flange portion 41 as well as of the bearing mount 15.

It has been found that the flywheel effect of the above-mentioned components of the primary mass 7 is too small for many applications, if one wants to use for the formed sheet-metal parts 35, 37 thicknesses of sheet metal which are sufficiently easy to form and to work. In order to raise the flywheel effect of the primary mass, one must provide on the primary mass 7 supplementary mass parts, not necessarily required for torque-transfer and torque-damping. A first supplementary mass is made up of the peripheral flange portion 45 of the formed sheet-metal part 37 and an axial extension 63 of the peripheral flange portion 41, which overlaps the peripheral flange portion 45. The extension 63 continues the peripheral flange portion 41 on that side of the wall part 43 that is directed away from the crankshaft 3; together with the peripheral flange portion 45, extension 63 extends axially beyond the outer perimeter of the mass disk 11 and ends radially outwardly of the friction clutch 21. In this manner, a region radially outwardly of the mass disk 11 and of the friction clutch 21 is used for accommodating a supplementary mass of the primary mass 7. The increase in mass provided by the peripheral flange portion 45 and by the extension 63 is achieved with the same material thickness of the formed sheet-metal parts 35, 37 that is in general use and is particularly effective since it is of a large diameter.

In its region that overlaps the peripheral flange portion 45, the extension 63 has an internal diameter that is greater than that of the peripheral flange portion 41 in the region of cavity 47; in other words, the extension has an axial shoulder or axial step 65 facing the wall part 43. The axial step 65 facilitates the assembly of the primary mass 7 because during assembly, the form@d sheet-metal part 37 can lie against step 65 while the peripheral flange portion 45 is welded to the extension 63.

A second supplementary mass is created by means of several superposed disk-shaped mass-rings 67 welded onto the base wall portion 39 of the formed sheet-metal part 35 on the outer side facing the crankshaft 3 in a radially outer region—a region in which a certain assembly space is still available because of the construction of the engine. In the case of the disk-shaped mass-rings 67, one can use closed rings. Also usable are mass-rings made up of several segments, such as for instance two semi-circular arcs, which are put together in segment fashion. The mass-rings 67 raise the moment of inertia of the primary mass 7 without the need to manufacture the two formed sheet-metal parts 35, 37 out of a thicker material.

Variants of the dual-mass flywheel are shown in FIGS. 2 to 8 and described below. The variants involve different ways of making the primary mass out of two formed sheet-metal parts that define a cavity in the radially outer region of the primary mass as well as ways of increasing the moment of inertia of a primary mass built up in this manner. Components of the variants of FIGS. 2 to 8 which function in the same manner are designated with the same reference numbers; they are differentiated by the addition of a letter suffix. In order to understand the design and manner of operation of these components, reference may be made in each case to the foregoing general description.

Figure 2:
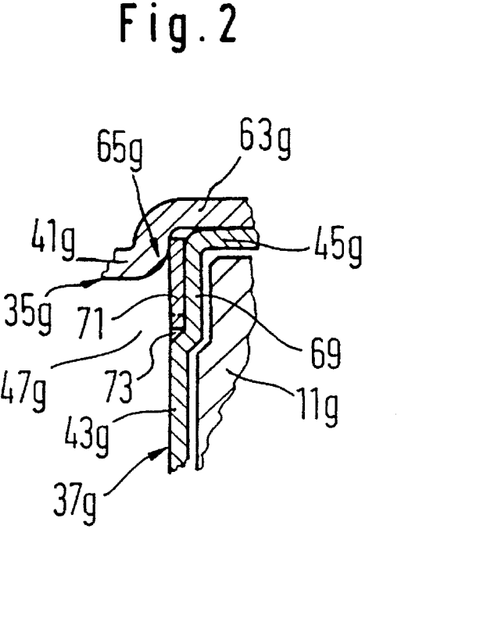
FIGS. 2 to 8 are fragmentary cross-sectional views of embodiments of a primary mass of the dual-mass flywheel according to the invention.

FIG. 2 shows a variant of a supplementary mass, which is housed inside the cavity 47g that accommodates the springs of the torsion-damping arrangement. In a flat bulge 69 which axially expands the cavity 47g in the region of the outer perimeter of wall part 43g of the formed sheet-metal part 37g, there is arranged a disk-shaped mass-ring 71 which, in an axial direction, is fixed between the axial step 65g of the peripheral flange portion 41g of the formed sheet-metal part 35g and the formed sheet-metal part 37g; in a radial direction, the mass-ring 71 is fixed by the extension 63g. Teeth 73, which may be provided on the formed sheet metal part 37g or on the component 35g, secure the mass-ring 71 in the circumferential direction. Even though it is an advantage of this form of embodiment that no additional fastening steps are required in order to fix the mass-ring 71, nonetheless the mass-ring 71 can also be fixed, if appropriate, by partial welding, such as with the wall part 43g.

Figure 3:
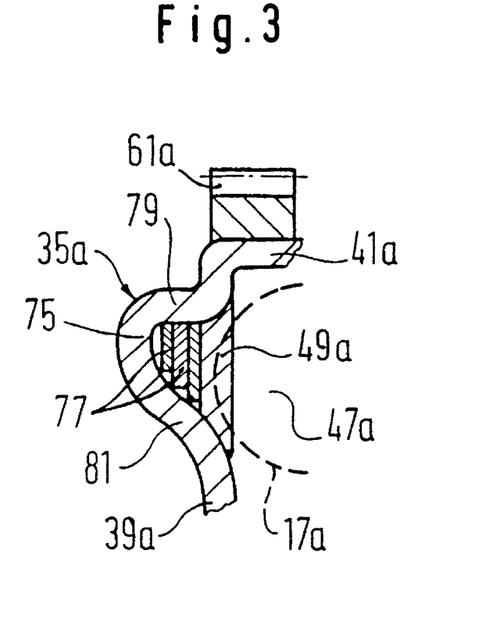

FIG. 3 shows a section from the radially outer region of the base wall portion 39a of the formed sheet-metal part 35a, namely a region in which in FIG. 1 the supplementary mass-rings 67 are arranged. Instead of rings added externally of the cavity, here the base wall portion 39a has in this region a ring-shaped bulge 75 which protrudes towards the crankshaft and receives additional disk-shaped mass-rings 77. The mass-rings 77 have different radial dimensions so that the inner space of the bulge 75 is filled essentially completely. The bulge has a radially outer wall 79 which is essentially cylindrical and a conical radial inner wall 81, which narrows the inner space axially towards the crankshaft; the bulge is partially delimited towards the cavity 47a (which contains the springs 17a), by means of the support plates 49h which engage the springs 17a. The support plates 49a hold the mass-rings 77 in the bulge 75 with axial pretensioning, by means of which, due to the conical shape of the wall 81, the mass-rings 77 are also held in a force fit in a radial direction. If appropriate, the mass-rings 77 may be clamped in an axially elastic manner, for instance by means of their own tension. Since the outer wall 79 is cylindrical, the centrifugal forces of the mass-rings 77 may be absorbed without axial stresses upon, for instance, the support plates 49a which are welded to the formed sheet-metal part 35a. It is clear that here again, the mass-rings 77 may be made up in segments that are consecutive in the circumferential direction. Furthermore, instead of the support plates 49a, one can also provide an enveloping or closure ring for the fastening of the mass-rings 77 in the bulge 75.

Figure 4:
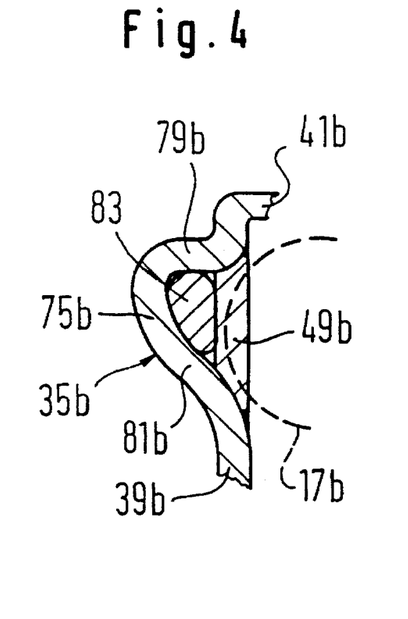

FIG. 4 shows a variant of FIG. 3, which differs from FIG. 3 in that instead of the stepped, disk-shaped mass-rings 77 of FIG. 3, an integral (one-piece) mass-ring 83 of FIG. 4 is provided in the bulge 75b. In the case of mass-ring 83 of FIG. 4, one can use, for instance, a wire ring or the like whose cross-sectional contour is matched to the inner contour of the bulge 75b by means of pressing or forging. If desired, the mass-ring 83 of FIG. 4 can also be made up of several circumferential segments.

Figure 5:
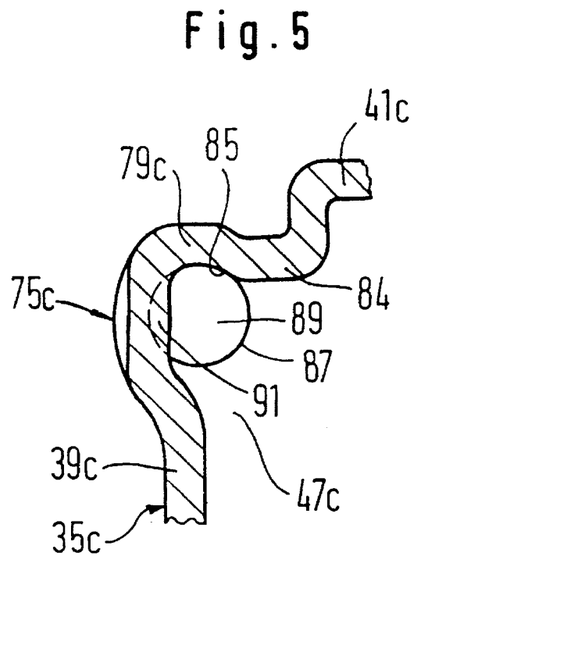

FIG. 5 shows a bulge 75c of the base wall portion 39c of the formed sheet-metal part 35c, which bulge 75c has a portion facing the axis of rotation; that is, in this case, the radial outer wall 79c makes a transition, in the region of the transition towards the peripheral flange portion 41c, into a radially inward protruding segment 84. The segment 84 produces in the bulge 75c an undercut 85 which axially retains a radially elastic mass-ring 87, the mass-ring being inserted into the inner space of bulge 75c. Furthermore, the bulge 75c supports the mass-ring 87 against centrifugal forces. The mass-ring 87 may be a slit ring, and the slit 89 receives a protuberance 91 that projects away from the crankshaft into the bulge for the purpose of securing the ring against rotating circumferentially.

Figure 6:
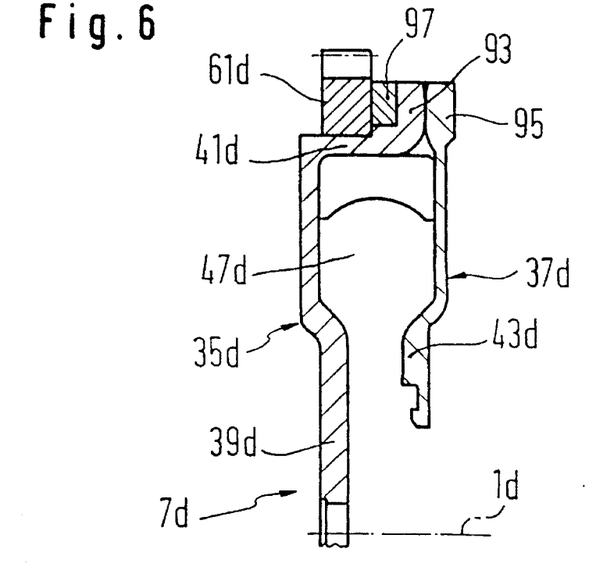

FIG. 6 shows a variant of the primary mass 7d which differs from the primary mass in FIG. 1 in that the formed sheet-metal part 35d, which is to be connected at its base wall portion 39d to the crankshaft, is provided, at that end of the peripheral flange portion 41d that is remote from the crankshaft, with a bend. The bend is directed radially outward and forms a collar 93. The formed sheet-metal part 37d, which delimits the cavity 47d towards the secondary mass, has a radial extension 95, which extends radially outward its wall part 43d (running in an essentially radial direction) beyond the diameter of the peripheral flange portion 41d of the formed sheet-metal part 35d. The two formed sheet-metal parts 35d, 37d are connected to each other in the region of the collar 93 and of the extension 95 in a rigid and tight manner, such as by welding. The collar 93 and the extension 95 represent a first supplementary mass, consisting directly of the material of the formed sheet-metal parts 35d, 37d. Furthermore, there is loosely placed upon the peripheral flange portion 41d, axially between the collar 93 and the starter ring gear 61d which is rigidly placed upon the peripheral flange portion 41d, a circumferentially continuous (disk-like) ring element 97 which is held in place axially by the collar 93 and by the starter ring gear 61d and is held against rotation by teeth (not shown).

Figure 7:
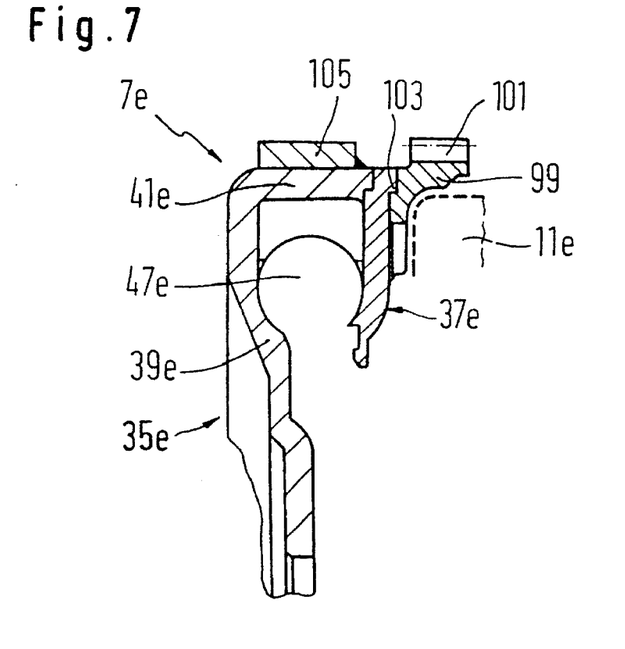

In FIG. 1, the supplementary mass that extends axially and overlaps radially the secondary mass is made up by axial extensions of the two formed sheet-metal parts. FIG. 7 shows a variant in which only the formed sheet-metal part 35e, which is fastened along its base wall portion 39e to the crankshaft, has a peripheral flange portion 41e which projects axially from the perimeter of the base wall portion 39e. The second formed sheet-metal part 37e runs essentially in an exclusively radial direction and is rigidly connected with the free end of the peripheral flange portion 41e in a butt connection by welding. On the side of the formed sheet-metal part 37e that faces axially away from the formed sheet-metal part 35e, there is attached, centered on the axis of rotation, a closed mass-ring extension 99 which has, integrally formed into its outer perimeter, a starter ring gear 101. By means of a step 37e, the mass-ring extension 99 is centered on the formed sheet-metal part 37e and is welded onto the latter. The mass-ring extension 99 extends in an axial direction to such an extent that it radially overlies the outer perimeter of the secondary disk 11e. On the outer contour of the peripheral flange portion 41e of the formed sheet-metal part 35e, there is welded a cylindrical ring-element 105. For practical reasons, the ring element 105 consists of pre-curved segments or shells, which can be easily made in a waste-free manner.

Figure 8:
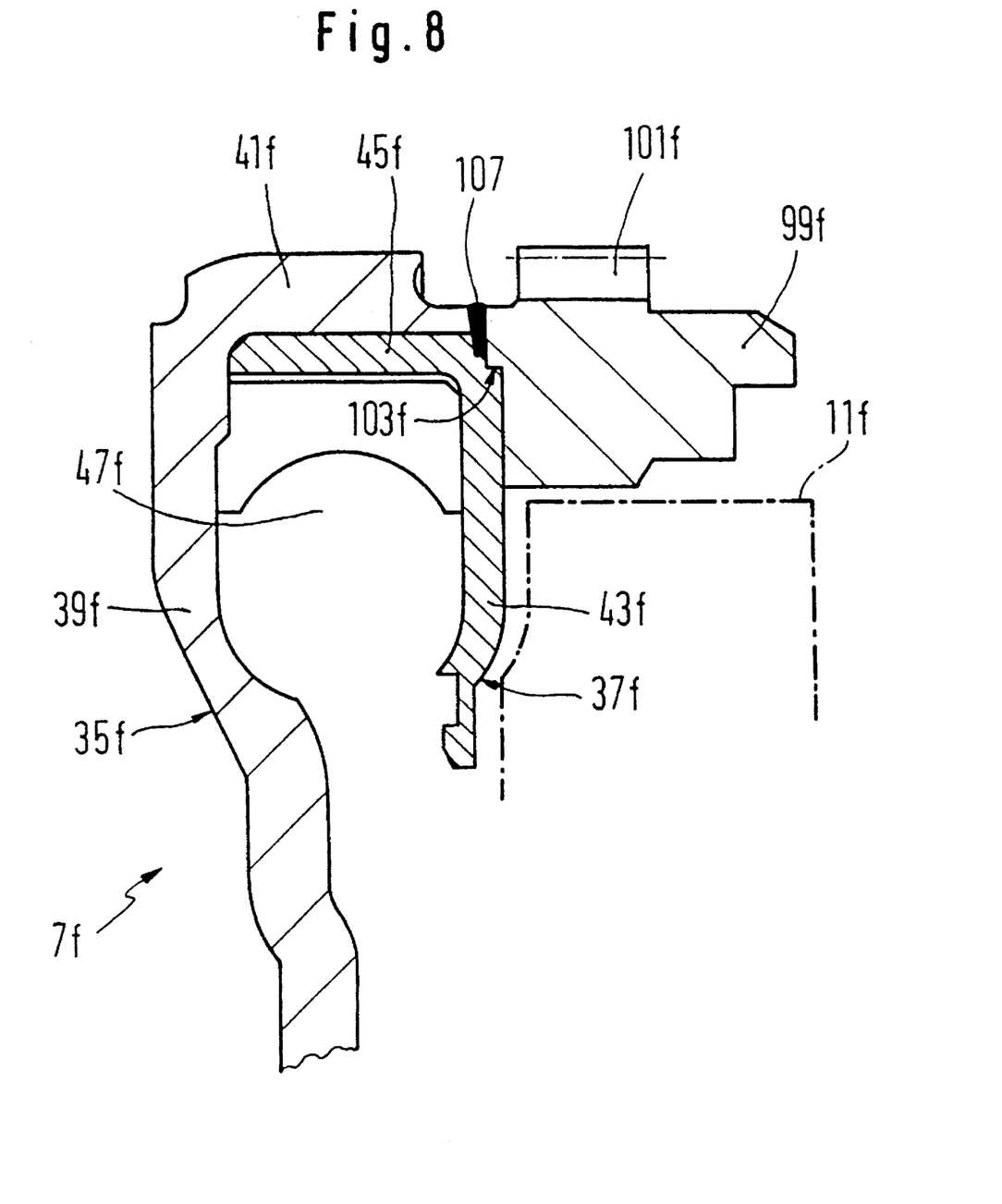

FIG. 8 shows a variant of the primary mass in FIG. 7 which differs in that not only the formed sheet-metal part 35f, which is fastened to the crankshaft, but also the formed sheet-metal part 37f, which is adjacent to the secondary disk 11f, are pan-shaped. From the radially outer region of the base wall part 43f of the formed sheet-metal part 37f, which wall part extends in an essentially radial direction, there protrudes a peripheral flange portion 45f that extends axially towards the crankshaft. The peripheral flange portion 45f engages in a concentrically matching manner the peripheral flange portion 41f of the formed sheet-metal part 35f and extends all the way to the base wall portion 39f. During assembly, the peripheral flange portion 45f on the one hand, centers the formed sheet-metal part 37f on the formed sheet-metal part 35f, and on the other hand, forms in the radially outer region of the primary mass 7f, a supplementary mass which is not necessarily required by the mechanical construction. According to FIG. 7, once again a mass-ring extension 99f is provided in the radially outer region of the primary mass 7f, which mass-ring extension overlaps axially with the outer perimeter of the secondary disk 11f and is equipped in one-piece fashion on its outer perimeter with a starter ring gear 101f. The mass-ring extension 99f, centered on the shoulder 103f of the formed sheet-metal part 37f, lies with an axial front-surface axially opposite the front end of the peripheral flange portion 41f. In this way, an enveloping weld seam 107 applied in this region connects into one unit not only the two formed sheet-metal parts 35f, 37f, but also the mass-ring extension 99f. Such a construction can be manufactured in a particularly low-cost manner.

The invention claimed is:

1. A dual-mass flywheel comprising a primary mass which is adapted to be fastened concentrically with an axis of rotation to a crankshaft of an internal-combustion engine, the primary mass having two formed sheet-metal parts of which formed sheet-metal parts a first formed sheet-metal part has the shape of a pan and has a base wall portion which extends in an essentially radial direction and is adapted to be attached to the crankshaft, and a peripheral flange portion which is joined to a radially outward end of the base wall portion and extends in an essentially axial direction away from the crankshaft and of which a second formed sheet-metal part is attached to the peripheral flange portion of the first formed sheet-metal part and has a base portion which extends in an essentially radial direction; which base portion, together with the first formed sheet-metal part, defines a cavity disposed concentrically with the axis of rotation in a radially outer region of the primary mass; a secondary mass which is mounted for rotation relative to the primary mass around the axis of rotation and is adapted to be attached to a friction clutch; and a torsion-damping arrangement which couples the secondary mass in a rotationally elastic manner with the primary mass and includes springs arranged in the cavity; and wherein the peripheral flange portion of the first formed sheet-metal part has at an end remote from the crankshaft a peripheral collar bent substantially radially outwardly and forming a one-piece supplementary mass; wherein said collar engages a wall portion of the second formed sheet-metal part and is rigidly connected at a juncture formed between the collar and said wall portion, a starter ring gear is affixed on the peripheral flange portion of the first formed sheet-metal part, and a circumferentially continuous supplementary mass-ring is axially affixed between the collar of the first formed sheet-metal part and the starter ring gear.

2. A dual-mass flywheel according to claim 1, wherein the wall portion of the second formed sheet-metal part that engages and forms a juncture with the collar lies in a substantially radial plane.

3. A dual-mass flywheel according to claim 2, wherein the the second formed sheet-metal part is welded to the collar at the juncture.

4. A dual-mass flywheel according to claim 1, wherein a starter ring gear is affixed on the peripheral flange portion of the first formed sheet-metal part.

5. A dual-mass flywheel according to claim 1, and wherein a circumferentially continuous supplementary mass-ring is axially affixed between the collar and the starter ring gear.

6. A dual-mass flywheel according to claim 1, wherein the collar and the second formed sheet-metal part have perimeter surfaces that are substantially flush with each other.

7. A dual-mass flywheel according to claim 1, wherein the circumferentially continuous supplementary mass-ring is axially affixed by engagement between the wall portion of the second formed sheet-metal part and the starter ring gear and is circumferentially affixed by teeth.

8. A dual-mass flywheel according to claim 1, wherein the collar, the second formed sheet-metal part, and the circumferentially continuous supplementary mass-ring have perimeter surfaces that are substantially flush with each other.

9. A dual-mass flywheel according to claim 1, wherein the collar, the second formed sheet-metal part, and the circumferentially continuous supplementary mass-ring have perimeter surfaces that are substantially flush with each other and with the bases of the teeth of the starter gear.

10. A dual-mass flywheel according to claim 1, wherein the wall portion of the second formed sheet-metal part is a radial extension of a wall of the second formed sheet-metal part forming the cavity.

* * * * *